(12) United States Patent
Shoji et al.

(10) Patent No.: US 6,817,460 B2
(45) Date of Patent: Nov. 16, 2004

(54) WET MULTI-PLATE CLUTCH

(75) Inventors: Masao Shoji, Fujisawa (JP); Yoshio Kinoshita, Shizuoka-ken (JP); Hirofumi Nakagomi, Fukuroi (JP); Joji Ito, Fukuroi (JP); Masahide Ogawa, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/198,128

(22) Filed: Jul. 19, 2002

(65) Prior Publication Data
US 2003/0015392 A1 Jan. 23, 2003

(30) Foreign Application Priority Data

Jul. 23, 2001 (JP) ........................................ 2001-257000

(51) Int. Cl.$^7$ ........................................ F16D 25/0638
(52) U.S. Cl. ................................................ 192/85 AA
(58) Field of Search ........................ 192/85 AA, 70.28, 192/109 A, 70.27, 70.2

(56) References Cited

U.S. PATENT DOCUMENTS 3,285,379 A * 11/1966 Helquist ................ 192/85 AA
3,858,698 A * 1/1975 Hause ................... 192/85 AA
4,694,946 A * 9/1987 Pearch et al. ........... 192/85 AA
5,752,810 A * 5/1998 Hein .......................... 417/319
5,960,923 A * 10/1999 Araki ..................... 192/85 AA
6,227,340 B1 * 5/2001 Braford, Jr. ................ 192/48.7
6,508,337 B1 * 1/2003 Esper ......................... 188/71.5

* cited by examiner

Primary Examiner—Saul Rodriguez
(74) Attorney, Agent, or Firm—Miles & Stockbridge P.C.

(57) ABSTRACT

The present invention provides a wet multi-plate clutch comprising a clutch case and hub disposed on a same axis, a first friction engagement element disposed in the clutch case, a second friction engagement element disposed on the hub, and a piston for applying an axial load to the first and second friction engagement elements, and wherein a recessed groove is formed in a surface of the piston opposing to the first and second friction engagement elements, and a wave spring is disposed within the recessed groove, and only a portion of the opposed surface at an outer diameter side or an inner diameter side of the recessed groove urges the respective friction engagement elements.

7 Claims, 6 Drawing Sheets

WET MULTI-PLATE CLUTCH

BACKGROUND OF THE INVENTION

1. Field of the Invention

The present invention relates to a wet multi-plate clutch used in an automatic transmission. More particularly, the present invention relates to an improvement in an urging arrangement for friction engagement elements.

2. Related Background Art

A wet multi-plate clutch has mainly been used in an automatic transmission since a torque transmitting property of such a clutch from a clutch releasing condition to a clutch lockup (frictional engagement) condition is very smooth. Further, in order to damp transmission shock of the automatic transmission, there has frequently been used a technique in which an elastic member is interposed between a piston and a friction engagement element.

FIG. 10 is an axial sectional view showing an example of a conventional piston. An elastic member, i.e., a wave spring 40 for damping transmission shock is disposed between urging surfaces 51 and 52 of a piston 50. Although the wave spring is arranged so that it is embedded into the urging surfaces 51, 52, the reason why such an arrangement is adopted is that an axial dimension of the wet multi-plate clutch is reduced.

However, in the wet multi-plate clutch having the above-mentioned arrangement, since the urging surfaces 51, 52 are flush with each other, when the piston urges the friction engagement elements, surface pressure distribution of a lockup load is widened, so that there arises a phenomenon (referred to as "shudder phenomenon" hereinafter) in which transmitting torque is varied repeatedly in friction engagement.

SUMMARY OF THE INVENTION

Accordingly, an object of the present invention is to provide a wet multi-plate clutch that can suppress a shudder phenomenon, while maintaining a reduced axial dimension of the wet multi-plate clutch.

To achieve the above object, the present invention provides a wet multi-plate clutch comprising a clutch case and hub disposed on a same axis, a first friction engagement element disposed in the clutch case, a second friction engagement element disposed on the hub, and a piston for applying an axial load to the first and second friction engagement elements, and wherein a recessed groove is formed in a surface of the piston opposing to the first and second friction engagement elements, and a wave spring is disposed within the recessed groove, and only a portion of the opposed surface at an outer diameter side or an inner diameter side of the recessed groove urges the respective friction engagement elements.

Further, in the present invention, the contact portion of the piston for urging the friction engagement element may be substantially line-shaped. Further, in the present invention, the urging surface of the piston may be arc-shaped. Here, the "urging surface" means a surface provided on the piston and adopted to contact with the friction engagement element when a lockup load is applied to the friction engagement elements.

In a preferred embodiment of the present invention, a separator plate is used as the first friction engagement element and a friction plate is used as the second friction engagement element. Further, a fundamental construction of the piston is substantially the same as that of the above-mentioned conventional piston. In addition, the separator plates are installed within the clutch case through splines for axial movement, and the friction plates are installed on the hub through splines for axial movement.

DETAILED DESCRIPTION OF THE PREFERRED EMBODIMENTS

Figure 1:
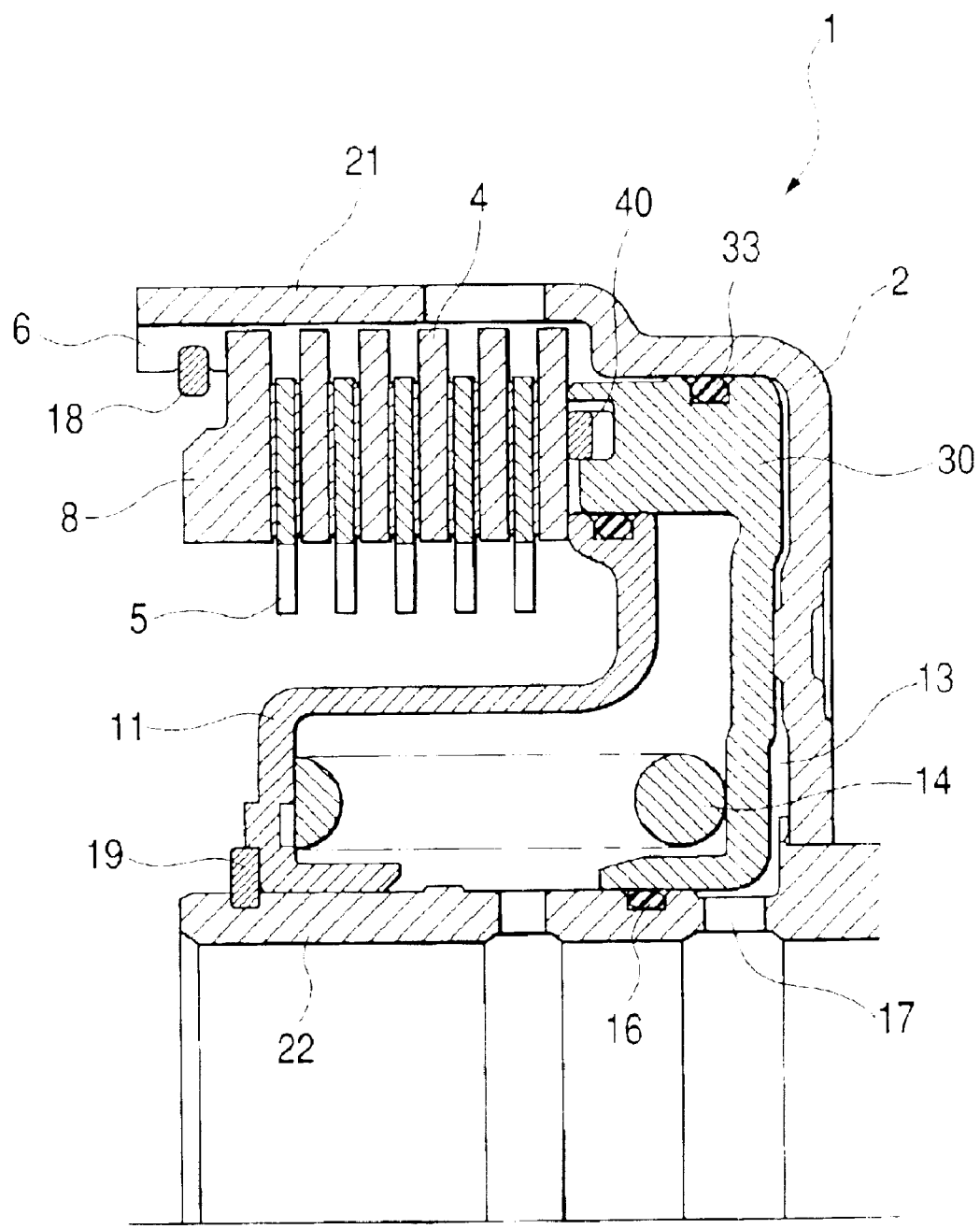
FIG. 1 is an axial sectional view of a wet multi-plate clutch according to an embodiment of the present invention.

The present invention will now be fully explained in connection with embodiments thereof with reference to the accompanying drawings. Incidentally, in the drawings, the same elements are designated by the same reference numerals.

Figure 2:
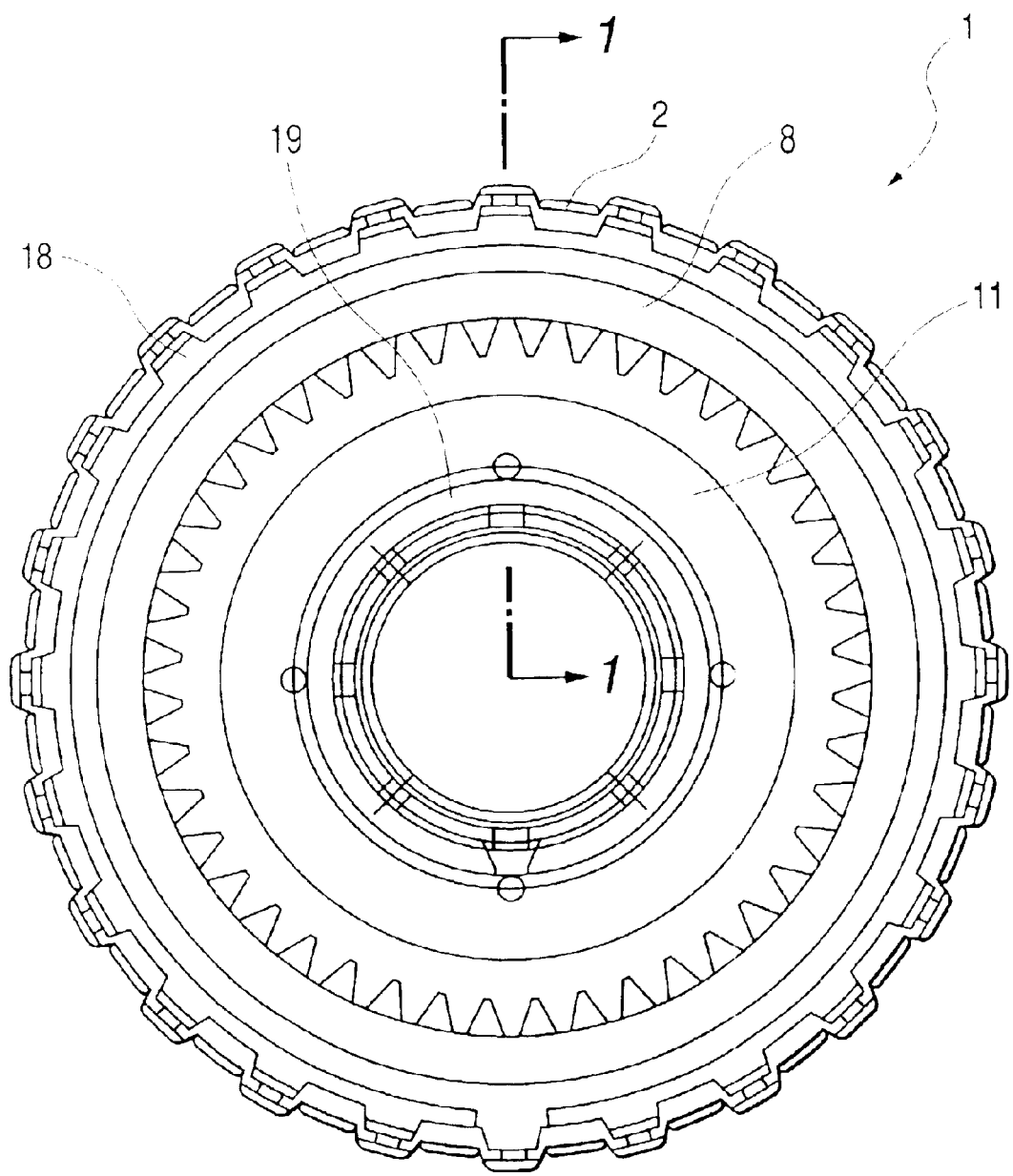
FIG. 2 is a front view of the wet multi-plate clutch according to the embodiment of the present invention.

FIGS. 1 and 2 show a wet multi-plate clutch according to an embodiment of the present invention. FIG. 1 is a sectional view taken along the line 1—1 in FIG. 2, and FIG. 2 is a front view of the clutch.

In a wet multi-plate clutch 1, a clutch case 2 and a hub (not shown) are disposed on a same axis. Splines 6 are formed on an inner periphery of an outer cylinder 21 of the clutch case 2, and separator plates 4 are provided on the splines 4 and friction plates 5 are provided on splines formed on an outer periphery of the hub (not shown), and the separator plate and the friction plates are arranged alternately. A backing plate 8 having an axial thickness greater than those of the separator plates 4 is disposed in an axial open end of the clutch case 2. These friction engagement elements are prevented from being dislodging and are restricted for axial movement by means of a stop ring 18.

On the other hand, a piston 30 is disposed adjacent to an axial closed end of the clutch case 2. The piston 30 is provided with a wave spring 40 disposed in a surface (of the piston) contacting with the separator plate (friction engagement element) 4. The piston is shifted to the left (FIG. 1) by supplying pressurized oil to an oil chamber 13 defined between the piston and an inner wall of the clutch case 2. The pressurized oil is supplied through an oil hole 17. Incidentally, in order to prevent leak of the operating pressurized oil, a seal ring 33 is provided on the piston 30 and a seal 16 is provided on an inner cylinder 22 of the clutch case 2. Further, when the pressurized oil is released from the oil chamber 13, the piston 30 is returned by a repelling force of a return spring 14, thereby releasing the friction engagement elements. The return spring 14 is supported by a snap ring 19 through a canceller 11.

Figure 3:
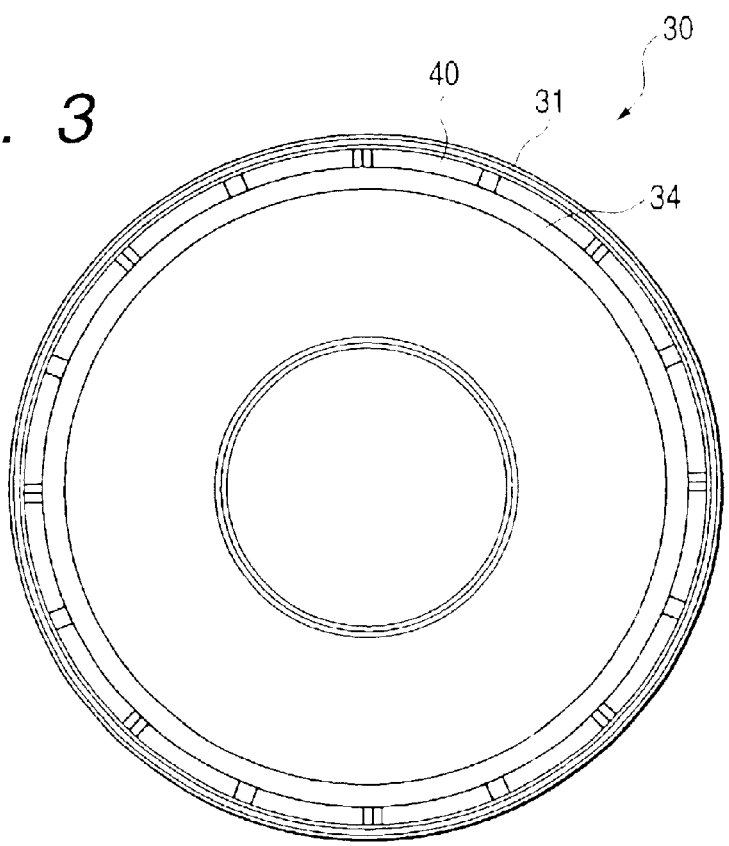
FIG. 3 is a front view of a piston according to a first embodiment of the present invention.
Figure 4:
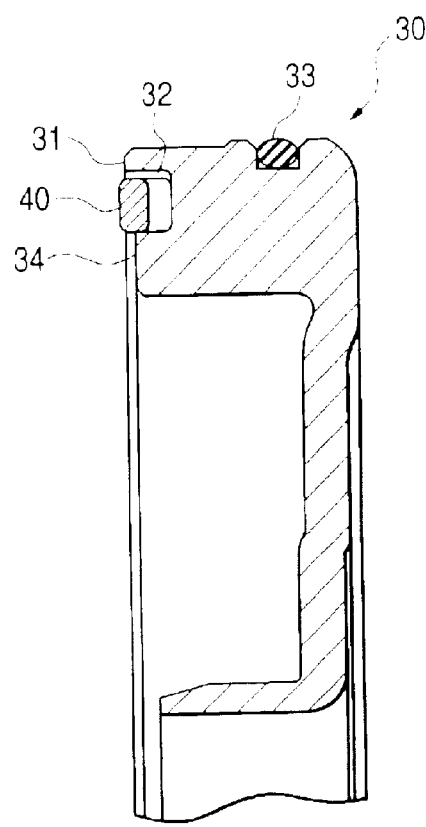
FIG. 4 is a front view of a piston according to a first embodiment of the present invention.

FIGS. 3 and 4 show a first embodiment of the present invention. FIG. 3 is a front view of the piston 30 and FIG. 4 is an axial partial sectional view of the piston 30. As mentioned above, the piston is provided at its outer periphery with the seal ring 33. Further, the piston is also provided at its outer periphery with a substantially annular urging surface 31 opposing to the friction engagement element such as the separator plate 4 in an axial direction and adapted to apply an axial urging force. Further, at an inner periphery side of the piston, there is provided a substantially annular surface 34 having an axial length smaller than that of the urging surface 31 (i.e., height smaller than that of the urging surface).

A substantially annular recessed groove 32 opened in a confronting relationship to the separator plate 4 is provided between the urging surface 31 and the surface 34. A substantially annular wave spring 40 is disposed in the recessed groove 32.

As apparent from FIG. 4, the wave spring 40 and the urging surface 31 can contact with the separator plate 4, but the surface 34 does not contact with the separator plate 4. With this arrangement, surface pressure distribution of a lockup load is limited to a small area, with the result that resonance is hard to occur.

Figure 5:
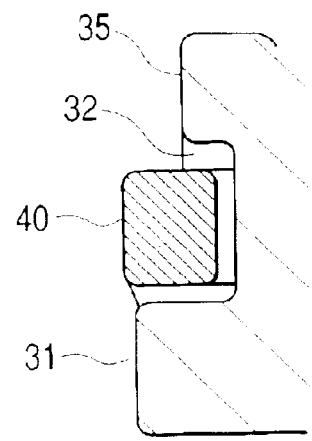
FIG. 5 is an enlarged view of main part in a second embodiment of the present invention.

FIG. 5 shows a second embodiment of the present invention. FIG. 5 is an enlarged view showing a part of the urging surface and the wave spring 40. In this second embodiment, contrary to the first embodiment, the urging surface 31 is provided at an inner periphery side of the recessed groove 32, and a surface 35 at an outer periphery side does not contact with the separator plate 4. Also in this second embodiment, similar to the first embodiment, the surface pressure distribution of the lockup load is limited to the small area, with the result that the resonance is hard to occur.

Figure 6:
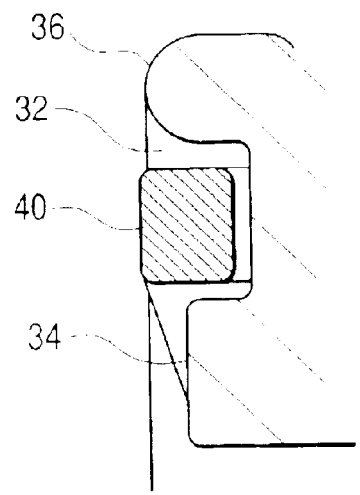
FIG. 6 is an enlarged view of main part in a third embodiment of the present invention.
Figure 7:
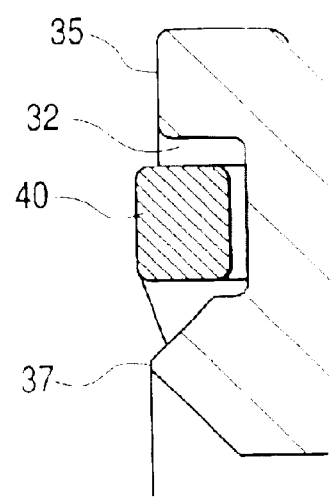
FIG. 7 is an enlarged view of main part in a fourth embodiment of the present invention.

FIGS. 6 and 7 show third and fourth embodiments of the present invention, respectively. In the third embodiment shown in FIG. 6, an urging surface 36 is provided at an outer diameter side of the recessed groove 32 and an axial sectional configuration of the urging surface is semi-circular. With this configuration, the urging surface is line-contacted with the friction engagement element to greatly reduce a contact area, thereby limiting the surface pressure distribution of the lockup load to a smaller area, with the result that the resonance is hard to occur.

On the other hand, in the fourth embodiment shown in FIG. 7, an urging surface 37 is provided at an inner diameter side of the recessed groove 32 and an axial sectional configuration of the urging surface is substantially triangular, and a tip end is chamfered. Also in this embodiment, a contact area to the friction engagement element can be reduced, thereby limiting the surface pressure distribution of the lockup load to a small area, with the result that the resonance is hard to occur.

Figure 8:
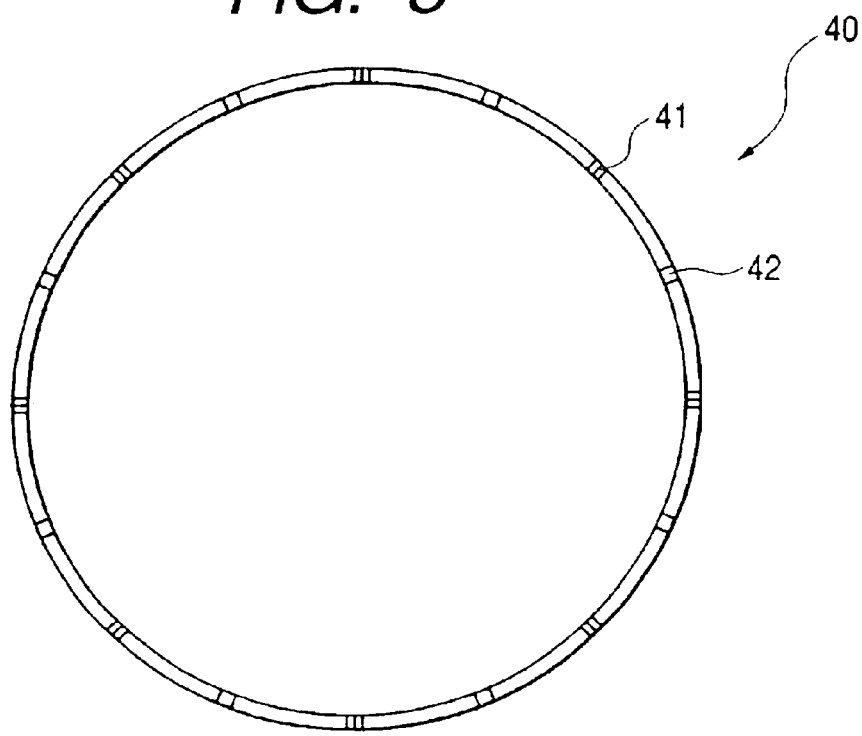
FIG. 8 is a front view of a wave spring.
Figure 9:
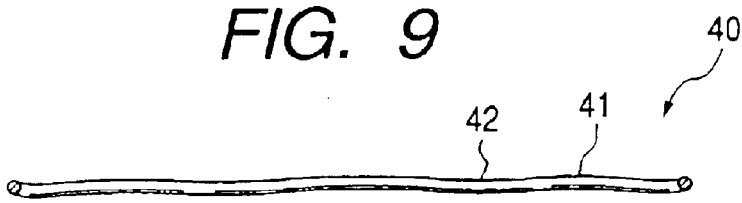
FIG. 9 is an axial sectional view of the wave spring.
Figure 10:
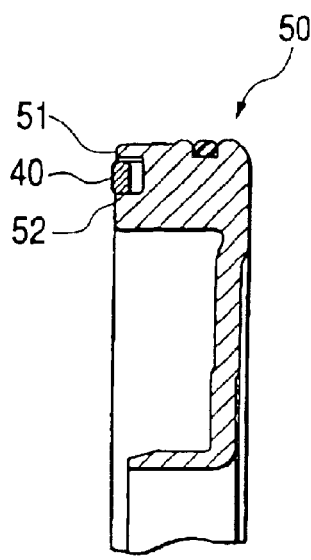
FIG. 10 is an axial sectional view of a conventional piston.

FIGS. 8 and 9 show the wave spring used in the various embodiments in detail. FIG. 8 is a front view and FIG. 9 is an axial sectional view. The substantially annular wave spring 40 has mountain portions 41 and valley portions 42 alternately along a circumferential direction, so that, when these mountain portions 41 and valley portions 42 are urged to be flattened, an elastic force is generated.

Figure 11:
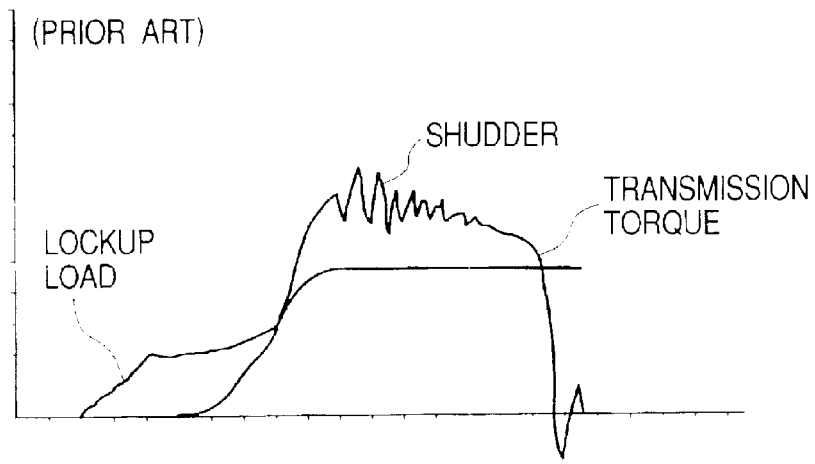
FIG. 11 is a graph showing a test result of a conventional wet multi-plate clutch.
Figure 12:
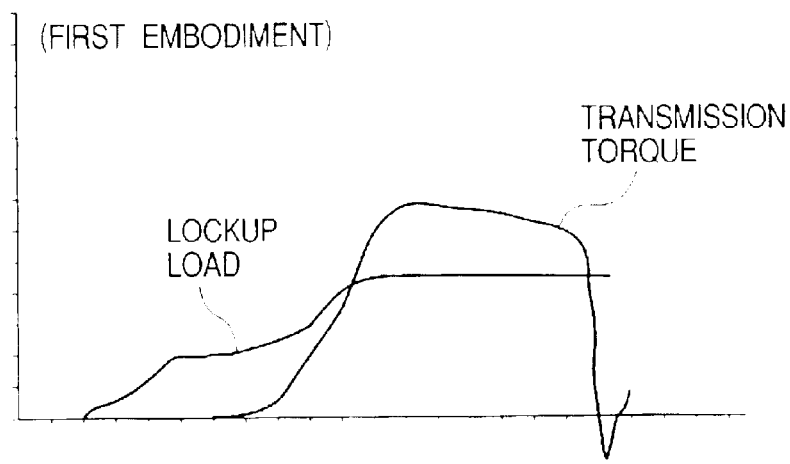
FIG. 12 is a graph showing a test result of a wet multi-plate clutch according to a first embodiment of the present invention.
Figure 13:
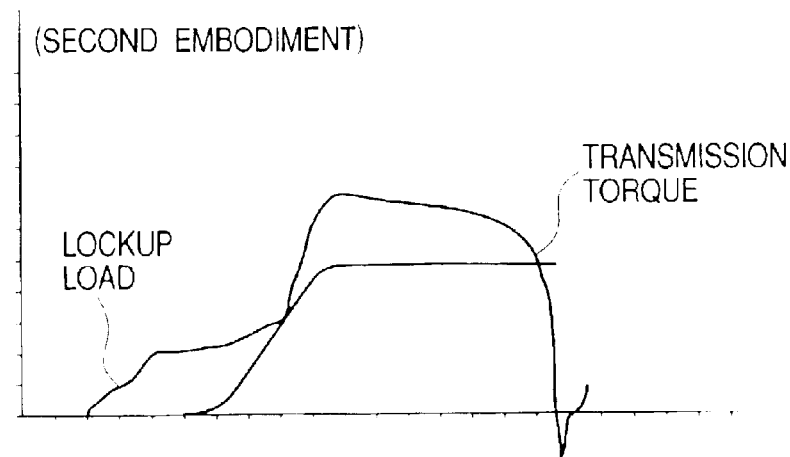
FIG. 13 is a graph showing a test result of a wet multi-plate clutch according to a second embodiment of the present invention.

A comparison test regarding the conventional wet multi-plate clutch and the wet multi-plate clutch according to the present invention was carried out. The test was performed in such a manner that, after the friction plates and inertia (inertia member) are rotated at a predetermined number of revolutions by means of an electric motor, a predetermined lockup load is applied to the friction engagement elements immediately after the driving from the electric motor is interrupted. It was examined how the transmitting torque is changed during a time period from when the lockup load is inputted to when the number of revolutions becomes zero. ATF (Automatic Transmission Fluid) is used as lubricating oil. Test conditions are as follows:

Initial number of revolutions: 3000 rpm
Oil temperature: 100° C.
Lockup load: 300 kgf
Amount of lubricating oil: 2.0 l/min
Lubricating method: axis core oil supplying method
Lubricating oil: ATF
Inertia: 0.49 kg.m$^2$
Lockup time: about 1 sec FIG. 11 shows the test result of the conventional wet multi-plate clutch, FIG. 12 shows the test result of the wet multi-plate clutch according to the first embodiment of the present invention, and FIG. 13 shows the test result of the wet multi-plate clutch according to the second embodiment of the present invention. Graphs indicate the lockup load and the transmission torque. Here, observing waveforms of the transmitting torques, it can be ascertained that, in the conventional case, amplitude of the torque, i.e., shudder is generated during a time period from when the lockup load is inputted to when the number of revolutions become zero. However, in the first and second embodiments of the present invention, it can clearly be recognized that there is substantially no shudder.

The present invention is carried out as the above-mentioned embodiments and achieves the effect that a wet multi-plate clutch which has a small axial dimension and in which a shudder phenomenon can be suppressed.

What is claimed is:

1. A wet multi-plate clutch comprising:
   a clutch case and hub disposed on a same axis;
   a first friction engagement element disposed within said clutch case;
   a second friction engagement element disposed on said hub; and
   a piston for applying an axial load to said first and second friction engagement elements;
   and wherein a recessed groove is formed in a surface of said piston opposing to said first and second friction engagement elements, a wave spring is disposed within said recessed groove, and said wave spring and only a portion of the opposed surface at an outer diameter side or an inner diameter side of said recessed groove urge said respective friction engagement elements.

2. A wet multi-plate clutch according to claim 1, wherein a contact portion of said piston for urging said friction engagement elements is substantially line-shaped.

3. A wet multi-plate clutch according to claim 1, wherein said portion of said opposed surface of said piston is arc-shaped.

4. A wet plate clutch comprising:

a clutch case and hub disposed on a same axis;

a first friction engagement element disposed within said clutch case;

a second friction engagement element disposed on said hub; and a piston which applies an axial load to said first and second friction engagement elements;

wherein a recessed groove is formed in a surface of said piston opposing to said first and second friction engagement elements, and a spring is disposed within said recessed groove such that when said piston is moved in a direction to apply the axial load to the first and second friction engagement elements, the spring and only a portion of said opposing surface at an outer diameter side or an inner diameter side of said recessed groove exert an axial engaging force on the first and second friction engagement elements.

5. A wet plate clutch according to claim 4, wherein the spring exerts an axial engaging force on the first and second friction engagement elements prior to said opposing surface exerting an axial engaging force thereon.

6. A wet multi-plate clutch according to claim 4, wherein a contact portion of said piston for urging said friction engagement elements is substantially line-shaped.

7. A wet multi-plate clutch according to claim 4, wherein said portion of said opposed surface of said piston is arc-shaped.

* * * * *